July 20, 1937.                   H. SCHMIDT                    2,087,657
       FREEWHEEL HUB WITH COASTER BRAKE AND LOCKING MEANS THEREFOR
                            Filed July 8, 1935
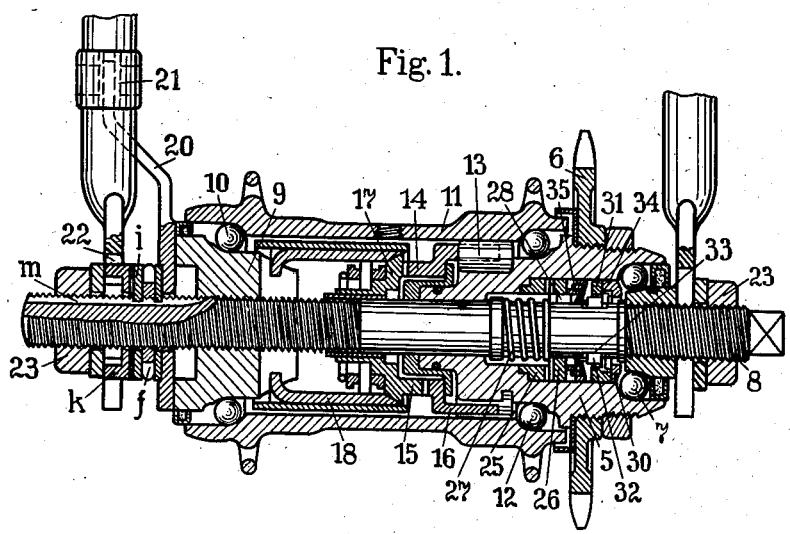
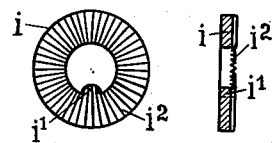
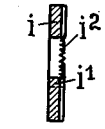
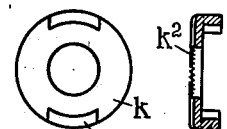
Inventor
Hermann Schmidt Patented July 20, 1937

2,087,657

UNITED STATES PATENT OFFICE 2,087,657

FREEWHEEL HUB WITH COASTER BRAKE AND LOCKING MEANS THEREFOR

Hermann Schmidt, Suhl, in Thuringia, Germany

Application July 8, 1935, Serial No. 30,268
In Germany July 9, 1934

1 Claim. (Cl. 192—6)

The invention relates to free-wheel coaster hubs with brake locking means, and more particularly to means for fixing the wheel axle thereof against rotation independently of the means connecting a stationary brake member with the vehicle frame. In coaster-hubs in which the abutment cone of the brake is non-rotatably connected to the vehicle frame but engaged with the wheel axle merely by screw-threads, the brake-locking means mounted on the said wheel axle (as illustrated in the Schmidt et al. Patent No. 2,012,893, issued August 27, 1935) can under exceeding turning moment cause rotation and consequent screwing of the axle relatively to the immobilized abutment cone.

The object of the invention is to provide means for preventing such disarrangement of the coaster-hub, thus securing correct working of both braking and locking.

This object is attained by the provision of interengaging elements directly and non-rotatably interconnecting the axle with the vehicle frame independently of the said abutment cone so that the said cone and the axle can be adjusted in their right working positions without interfering with one another.

In the accompanying drawing, which forms a part of this specification, a constructional embodiment of the invention is represented by way of example. In the drawing—

Fig. 1 illustrates a longitudinal sectional view of a free-wheel hub with coaster brake and brake locking means, means being provided for independently of each other fixing the abutment cone and the axle to the bicycle frame, Fig. 2 is a face view of one part of the axle-locking device in front-elevation, Fig. 2a is a section through the part shown in Fig. 2, Fig. 3 is a face view of the other part of the axle-locking device in back-elevation, and Fig. 3a is a central section of the part shown in Fig. 3.

The free-wheel hub with back-pedalling brake comprises a driving member 5 having a sprocket wheel 6 mounted on it, a ball bearing 7 supporting the said driver on the wheel axle 8, a brake cone 9 screwed on the other end of the axle, a hub shell 11, a ball bearing 10 supporting the adjacent end of the said hub shell 11 on the cone 9, and another ball bearing 12 supporting the hub shell upon the driver 5. A friction roller clutch 13 mounted on the driver couples the driver to the hub shell on forward pedalling, while cam teeth 14 and 15 projecting from a roller guide ring 16 and a shiftable brake expanding cone 17 respectively will on back-pedalling displace the said cone 17 on the axle 8 towards the abutment cone 9 thereby expanding a brake sleeve 18 disposed between said two cones and press it on to the inner face of the hub shell, as more particularly described in the U. S. Patent No. 777,811 to Ernst Sachs.

The wheel axle 8 is as usual mounted in the fork ends 22 of the bicycle frame by nuts 23, while by means of a lock nut $f$ the abutment cone 9 is held interengaged with an arm or lever 20 the free end of which is attached to a fork tube by a clip 21 so that the cone 9 is prevented from rotation.

The brake-locking device of the coaster-hub comprises a toothed clutch having a member 25 rigidly attached to the driver and a member 26 shiftable on the axle 8 but non-rotatably guided thereon by a key 28, a spring 27 tending to disconnect the clutch. The device for engaging the clutch is composed of a ring 30 screwed into the bore of the driver and a ring 31 shiftably guided in the driver and prevented from turning backwards by friction rollers 32 movable on cam faces 33 of the axle. Cams 34 oppositely projecting from the adjacent sides of the rings 30 and 31 will on back-pedalling displace the ring 31 towards the clutch 25, 26, so that by means of an interposed conical spring 35 the ring 26 is brought into engagement with the ring 25 thereby fixing the driver in its adjusted position in which the brake is secured in the applied position.

In this arrangement the axle is left screwable in the cone 9 so that accidental high torsional moment transmitted on the axle from the locking device may be able to give it an undue angular displacement in spite of the clamping stress of the nuts 23. In order that the hub axle 8 is positively secured against rotation discs $i$ and $k$ are provided for by the side of the abutment cone 9. By a key $i^1$ projecting from the bore of the disc $i$ and extending into a longitudinal groove $m$ of the axle the disc $i$ is susceptible of being lengthwise adjusted on the hub axle 8 but prevented from turning thereon, the side of the said disc $i$ directed towards the fork end 22 being provided with radial teeth $i^2$ for engagement with a similar indentation $k^2$ of another disc $k$ provided with projections $k^1$ which extend into the slot of the fork end 22. For adjustment, the hub axle 8 is allowed to be displaced and turned within the bore of the member $k$, and it is immobilized therein but by the engagement of the teeth $k^2$ with the teeth $i^2$ of the disc $i$.

When the ball bearings are to be readjusted by an angular displacement of the hub axle 8 relatively to the abutment cone 9 the nuts 23 and the lock nut $f$ are to be loosened and the teeth $i^2$, $k^2$ are brought out of engagement after the frame fork has been spreaded or enlarged.

I claim:

In a free-wheel hub with coaster brake and brake locking means for bicycles, the combination with a brake member, of an arm non-rotatably interconnecting the said brake member with the vehicle frame, a wheel axle, a brake locking device mounted on said wheel axle, and a separate appliance for non-rotatably and positively connecting the wheel axle with the vehicle frame independently of the said brake member, said separate appliance comprising a body keyed to the wheel axle and another body keyed to the vehicle frame, means being provided on said two bodies which allow their engagement in any angular relationship.

HERMANN SCHMIDT.